Aug. 17, 1965   R. P. BRIGMAN ETAL   3,200,573
COTTON HARVESTERS

Filed May 22, 1963   2 Sheets-Sheet 1

Richard P. Brigman,
Joseph E. Fogg,
Inventors.
Koenig, Pope, Senniger and Powers,
Attorneys.

Aug. 17, 1965   R. P. BRIGMAN ETAL   3,200,573
COTTON HARVESTERS
Filed May 22, 1963   2 Sheets-Sheet 2
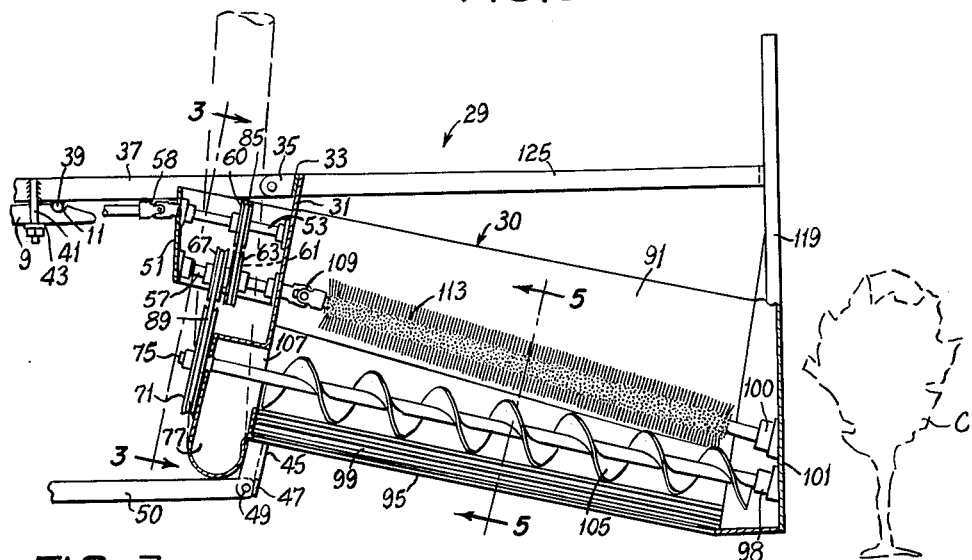
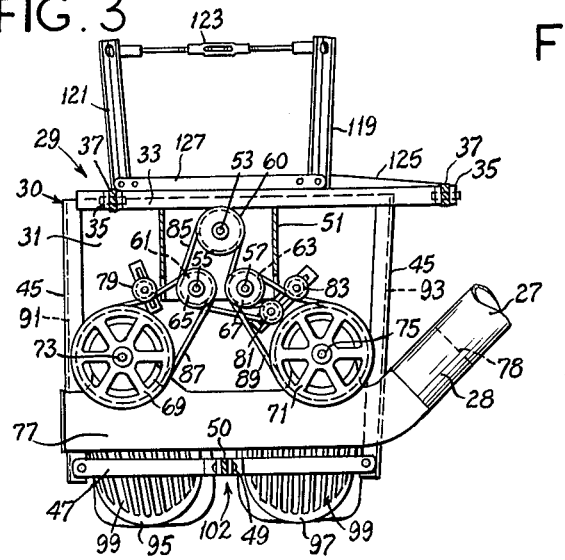
Richard P. Brigman,
Joseph E. Fogg,
Inventors.
Koenig, Pope, Senniger and Powers,
Attorneys.

United States Patent Office 3,200,573
Patented Aug. 17, 1965

3,200,573
COTTON HARVESTERS
Richard P. Brigman, Colt, and Joseph E. Fogg, Forrest City, Ark., assignors to Forrest City Machine Works, Incorporated, Forrest City, Ark., a corporation of Arkansas
Filed May 22, 1963, Ser. No. 282,479
1 Claim. (Cl. 56—35)

This invention relates to cotton harvesters, and more particularly to an improved cotton stripping attachment for such a harvester.

Among the several objects of this invention may be noted the provision of an attachment for cotton pickers adapted to harvest late-developing cotton bolls or a tail-end crop more economically than by a conventional cotton picker, stripper, or manual labor; the provision of such an attachment which may be readily connected to a conventional cotton picker, thus avoiding the need for two complete harvesting rigs to perform picker and stripper functions; and the provision of such an attachment which is low in cost. Other objects and features will be in part apparent and in part pointed out hereinafter.

The invention accordingly comprises the structures hereinafter described, the scope of the invention being indicated in the following claim.

In the accompanying drawings, in which one of various possible embodiments of the invention is illustrated, FIG. 1 is a side elevation illustrating the attachment constituting the invention, connected to a rig normally used for attachment of a cotton picker;

FIG. 2 is an enlarged side elevation of the attachment, parts being broken away for clarity;

FIG. 3 is a cross section taken on line 3—3 of FIG. 2;

FIG. 4 is a right-hand end view of FIG. 2; and

FIG. 5 is a section taken on line 5—5 of FIG. 2.

Corresponding reference characters indicate corresponding parts throughout the several views of the drawings.

Figure 1:
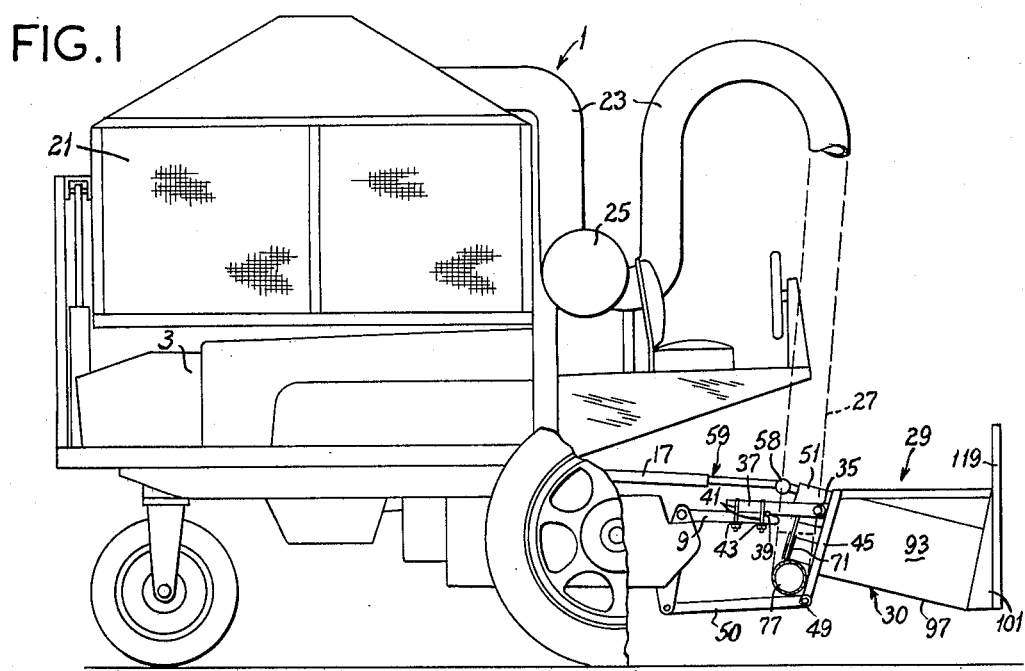

In operation a cotton picker is driven along rows of cotton after the cotton bolls have matured. The picker spindles remove most, although not all, of the cotton bolls from the plants. The remaining cotton bolls are conventionally removed either by hand or by a machine often referred to as a cotton stripper.

It is a time-consuming and expensive process to remove the remaining bolls by hand. A cotton stripper is generally similar to a cotton picker, being carried on another tractor. While a cotton stripper effectively removes all of the remaining cotton bolls, it also brushes leaves, some twigs and other foliage from the plants into the conveyor system, thus soiling the cotton. The value of the soiled cotton is substantially less than the high-grade cotton harvested by a cotton picker. Inasmuch as the use of the cotton stripper results in low-grade cotton, it will be seen that the ratio of the cost of a complete cotton stripper to the profit obtained from its use is relatively high. By means of the present attachment, which may be referred to as a cotton stripper attachment for the picker, remaining cotton bolls are harvested without the need of a complete cotton stripper rig.

Referring now more particularly to the drawings, there is shown at 1 a conventional rig such as normally accepts a cotton harvester (not shown). It includes a tractor 3 which, when my attachment is employed thereon, is operated in reverse (to the right as shown in FIG. 1). The rig includes a conventional cotton basket 21 and a conventional suction ductwork 23, 27, and also a conveyor fan 25. The duct 27 is attached to my stripper attachment which includes a pair of revolving brushes for brushing the cotton bolls from the plants into troughs. Screws in the troughs convey the cotton to a duct such as 27. The attachment as a whole is adapted to be connected quickly and easily to the rig 1 after removal of its cotton picker elements. The new stripper attachment is generally indicated at 29. It comprises a framework 30 having an end wall or rear support 31 to which is secured a bar 33. Two pivot means or clevises 35 are attached to bar 33 and extend rearward therefrom. There is an extension arm or link 37 from each clevis 35 to a conventional lifting arm 9 of the rig. Although the rig has two lifting arms 9, only one appears in the side view of FIG. 1. Each extension 37 has a short rod 39 secured to it to fit within bearing 11 in the respective lifting arm 9. Bolts 41 are secured to opposite sides of each extension 37. The bolts 41 extend downwardly on opposite sides of the respective lifting arm 9. Plates 43 are located below each extension and have holes through which the bolts 41 pass. Each extension is secured to its respective lifting arm by tightening nuts on the bolts 41 below the plates 43.

Angle irons 45 extend downwardly along the side edges on end wall 31. A cross member 47 extends between the lower ends of angle irons 45. At the center of the cross member 47 is a pivot means or clevis 49. A radius rod or link 20 of the desired length is connected to clevis 49. The tractor frame, lifting arms 9, attachment 29 and radius rod 50 form a generally, if not exact, parallel linkage. Thus, the attachment 29 remains in substantially the same angular relationship with the ground as the attachment is raised and lowered.

A box-shaped bracket 51 extends rearward from wall 31. Shafts 53, 55 and 57 are rotatably supported within the bracket 51 and wall 31. Shaft 53 is an input shaft and extends through the real wall of bracket 51. It is connected to a variable-angle drive means or universal joint 58. Universal joint 58 is joined to the drive shaft 17 of the tractor by a splined connection 59. A pulley 60 is fixed on shaft 53 and pulleys 61 are 63 are fixed on shafts 55 and 57, respectively, in the same plane as pulley 60. Two additional pulleys 65 and 67 are fixed on shafts 55 and 57 respectively, adjacent to and rearward of the pulleys 61 and 63. Two larger pulleys 69 and 71 are fixed on screw conveyor shafts 73 and 75, respectively. The shafts extend through the rear wall 31 and a plenum chamber 77 attached to the wall 31. This chamber 77 terminates at a nozzle 78 adapted to form an attachment with duct 27 at a boot 28. Idlers 79, 81 and 83 are adjustably connected to wall 31. A belt 85 is trained around pulleys 60, 61 and 63 and idler 81 to transmit the rotary motion of shaft 53 to shafts 55 and 57. A second belt 87 is trained around pulleys 65 and 69 and idler 79 to transmit the rotary motion of shaft 55 to shaft 73. A third belt 89 is trained around pulleys 63 and 71 and idler 83 to transmit the rotary motion of shaft 57 to shaft 75.

Side walls 91 and 93 extend forward from rear end wall 31 to the front of the attachment. The side walls at their lower portions are inwardly curved to form sidewise troughs 95 and 97. Troughs 95 and 97 are slotted on their bottoms as indicated at 99. Curved front walls or guides 101 enclose the forward ends of the troughs. The forward ends of shafts 73 and 75 are rotatably mounted in bearings 98 in the front walls 101. The troughs form therebetween a cotton-plant-receiving slot 102 having a front plant-receiving opening 104. The screws or conveyors 103 and 105 of the shafts 73 and 75 are constructed so as to move cotton rearwardly through openings 107 in the rear wall 31 into chamber 77.

Shafts 55 and 57 extend through wall 31 and are connected by universal joints 109 to brushes 111 and 113. The brushes are inclined downwardly to the front walls 101 in which the forward ends of the brushes are rotatably mounted in bearings 100. The brushes are preferably made of nylon bristles, for example, each brush having four equally spaced elongated tufts. The inner edges of troughs 95 and 97 terminate slightly below brushes 111 and 113 and are inclined in the same manner as the brushes. The guides or front walls 101 guide cotton plants into the space between brushes 111 and 113. A pair of angle irons 119, 121 are secured as by welding, for example, to guide 101. Angle irons 119 and 121 extend upwardly between the upper ends of the guides and are connected by a turnbuckle 123. A bar 125 extends between angle iron 119 and one end of bar 33. A link 127 extends between and is pivotally connected to the angle irons 119 and 121 below turnbuckle 123.

The cotton harvesting attachment is utilized in the following manner:

The attachment 29 is connected to the cotton picker rig by securing the extensions 37 to the lifting arms 9 with the short rods 39 located in grooves or bearings 11. The radius rod 50 is then connected to the tractor 3 and the clevis 49. Drive shaft 17 is connected to the universal joint 58 by the splined connection 59. The machine is then driven down a row of cotton so that the guides 101 travel on opposite sides of the cotton plants and guide the latter into the attachment. A single cotton plant is indicated in broken lines at C in FIGS. 2 and 4. The drive is such that pulley 60 is driven counterclockwise as viewed in FIG. 3, thus causing clockwise rotation of brush pulley 63 and screw pulley 71 and counterclockwise rotation of brush pulley 61 and screw pulley 69. The brushes and screws are thus driven in the direction indicated by the arrows in FIG. 5. As a plant C is guided between brushes 111 and 113 the cotton bolls and other foliage adjacent the lower portion of the plant are initially stripped from the plants and brushed into the troughs 95 and 97. The slots in the troughs 95 and 97 permit small twigs, leaves, et cetera to fall through the foraminating slots 99. Other foraminations than slots may be used. As the machine approaches a plant C the brushes remove the cotton bolls and some foliage of the plant. The screws 103 and 105 convey the cotton bolls through the holes 107 in the rear wall 31 and into the duct 77. The cotton bolls are then conveyed through the ductwork 23 into the cotton basket 21 by the conveyor system of the cotton picker rig.

It will be seen that the attachment is effective in stripping the tail-end of the cotton crop but is relatively inexpensive compared to the cost of a cotton stripper. One reason for the low cost of harvesting the tail-end of the crop in this manner is that the stripping attachment is attachable to exising cotton picker rigs. It will be understood that the pulleys and the belts trained around them constitute a power transmission for the attachment. The location of the plenum chamber 77 beneath the power transmission provides for a compact assembly.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

A stripping device for attachment to cotton harvester rigs having power and suction means, pivoted lifting arm means and a pivot for attachment of radius rod means; comprising of framework having an upper rear support wall and a lower open front portion for receiving cotton plants for stripping, said wall having two openings therein, rotary cotton stripping brushes extending from the rear support down to the front portion, spaced troughs connected with said openings and containing screw conveyors extending down from the openings in said wall to the front portion for receiving stripped cotton from the brushes and moving it rearwardly to the support, a plenum chamber on said wall having means for effecting a connection with said suction means of the rig, said chamber being characterized by the absence of blower means therein, whereby suction from the harvester rig is in free communication with said openings through the plenum chamber, drive means carried on the rear support for the conveyors and brushes for connection through a universal joint with the power means of the rig, extension means pivoted to said rear support wall including means for making a quick-detachable connection with the pivoted lifting arm means of the rig to form an extended lifting arm, rotatable radius rod means for connecting said support to a rig, said support wall, said radius rod, said rig frame and said extended lifting arm forming a substantially parallel linkage for maintaining the stripping device in substantially parallel positions when adjusted by means of the extended lifting arm to various elevations above the ground.

References Cited by the Examiner

UNITED STATES PATENTS

| | | | |
|---|---|---|---|
| 2,399,718 | 5/46 | Baker et al. | 56—14 |
| 2,903,835 | 9/59 | Kappelmann | 56—33 |

T. GRAHAM CRAVER, *Primary Examiner.*

RUSSELL R. KINSEY, *Examiner.*